United States Patent
Zhang et al.

(10) Patent No.: US 10,349,357 B2
(45) Date of Patent: Jul. 9, 2019

(54) METHOD AND APPARATUS FOR CONTROLLING TRANSMIT POWER OF USER EQUIPMENT

(71) Applicant: Huawei Technologies Co., Ltd., Shenzhen (CN)

(72) Inventors: Peng Zhang, Shanghai (CN); Yueying Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/650,643

(22) Filed: Jul. 14, 2017

(65) Prior Publication Data

US 2017/0318542 A1    Nov. 2, 2017

Related U.S. Application Data

(63) Continuation of application No. PCT/CN2015/070845, filed on Jan. 16, 2015.

(51) Int. Cl.
*H04W 52/14* (2009.01)
*H04W 52/34* (2009.01)
(Continued)

(52) U.S. Cl.
CPC ......... *H04W 52/146* (2013.01); *H04W 52/04* (2013.01); *H04W 52/16* (2013.01);
(Continued)

(58) Field of Classification Search
USPC ....................................................... 455/522
See application file for complete search history.

(56) References Cited

U.S. PATENT DOCUMENTS

| 8,868,121 B2 * | 10/2014 | Ventola ............... H04W 52/146 370/318 |
| 2006/0183428 A1 * | 8/2006 | Heo ..................... H04W 52/146 455/67.11 |

(Continued)

FOREIGN PATENT DOCUMENTS

| CN | 102273252 A | 12/2011 |
| CN | 102695247 A | 9/2012 |

(Continued)

OTHER PUBLICATIONS

"3rd Generation Partnership Project; Technical Specification Group Radio Access Network; Physical layer procedures (FDD)(Release 12)," 3GPP TS 25.214 v12.0.0, XP50869356, pp. 1-136, 3rd Generation Partnership Project, Valbonne, France (Sep. 2014).*

(Continued)

*Primary Examiner* — Nay A Maung
*Assistant Examiner* — Erica L Fleming-Hall
(74) *Attorney, Agent, or Firm* — Leydig, Voit & Mayer, Ltd.

(57) ABSTRACT

Embodiments of the present invention provide a method and an apparatus for controlling transmit power of user equipment. The method includes: when total uplink transmit power of user equipment UE exceeds maximum allowed transmit power, calculating a first gain factor according to the maximum allowed transmit power; performing quantization processing on the first gain factor according to a gain factor of a first physical channel, to obtain a second gain factor, where the first physical channel includes a DPCCH2; reducing a gain factor of a second physical channel to the second gain factor, to reduce transmit power of the second physical channel, so that the total uplink transmit power of the UE does not exceed the maximum allowed transmit power, where the second physical channel includes an (Continued)

HS-DPCCH. This reduces a calculation error and improves control accuracy of transmit power.

17 Claims, 2 Drawing Sheets

(51) Int. Cl.
    *H04W 52/36* (2009.01)
    *H04W 52/52* (2009.01)
    *H04W 52/04* (2009.01)
    *H04W 52/16* (2009.01)
    *H04W 52/32* (2009.01)
    *H04W 36/18* (2009.01)

(52) U.S. Cl.
    CPC ......... *H04W 52/325* (2013.01); *H04W 52/34* (2013.01); *H04W 52/367* (2013.01); *H04W 52/52* (2013.01); *H04W 36/18* (2013.01); *H04W 52/362* (2013.01)

(56) References Cited

U.S. PATENT DOCUMENTS

| | | | | |
|---|---|---|---|---|
| 2006/0217088 | A1* | 9/2006 | Nagaoka | H04W 52/286 455/127.1 |
| 2009/0154403 | A1* | 6/2009 | Niwano | H04W 52/282 370/329 |
| 2010/0087202 | A1 | 4/2010 | Ventola et al. | |
| 2010/0172428 | A1 | 7/2010 | Pani et al. | |
| 2010/0273520 | A1* | 10/2010 | Pelletier | H04L 5/0007 455/522 |
| 2011/0105174 | A1* | 5/2011 | Pelletier | H04W 52/42 455/522 |
| 2012/0176947 | A1* | 7/2012 | Xi | H04L 1/0026 370/311 |
| 2012/0224552 | A1* | 9/2012 | Feuersanger | H04L 5/0007 370/329 |
| 2014/0141831 | A1* | 5/2014 | Ma | H04W 52/146 455/522 |
| 2015/0036668 | A1* | 2/2015 | Kanamarlapudi | H04W 52/146 370/336 |
| 2015/0163754 | A1* | 6/2015 | Konuskan | H04W 72/0473 455/522 |
| 2015/0271769 | A1* | 9/2015 | Bharadwaj | H04W 52/325 455/522 |
| 2016/0037461 | A1 | 2/2016 | Geng et al. | |
| 2017/0026918 | A1 | 1/2017 | Geng et al. | |

FOREIGN PATENT DOCUMENTS

| | | |
|---|---|---|
| CN | 104221446 A | 12/2014 |
| WO | 2014166120 A1 | 10/2014 |

OTHER PUBLICATIONS

"3rd Generation Partnership Project; Technical Specification Group Radio Access Network; Spreading and modulation (FDD)(Release 12)," 3GPP TS 25.213 V12.0.0, XP50925762, pp. 1-50, 3rd Generation Partnership Project, Valbonne, France (Sep. 2014).*

"New Work Item proposal: Further EUL enhancements—Core," 3GPP TSG RAN Meeting #62, Busan, Korea RP-132078, 3rd Generation Partnership Project, Valbonne, France (Dec. 3-6, 2013).

"Introduction of Further EUL Enhancements," 3GPP TSG RAN WG1 Meeting #78, R1-143493, Change Request 25.214 CR 0720,Current version: 11.9.0, 3rd Generation Partnership Project, Valbonne, France (Aug. 18-22, 2014).

"3rd Generation Partnership Project; Technical Specification Group Radio Access Network;Physical layer procedures (FDD)(Release 11)," 3GPP TS 25.214 V11.7.0, 3rd Generation Partnership Project, Valbonne, France (Sep. 2013).

"3rd Generation Partnership Project; Technical Specification Group Radio Access Network; Physical layer procedures (FDD)(Release 12)," 3GPP TS 25.214 V12.1.0 3rd Generation Partnership Project, Valbonne, France (Dec. 2014).

"3rd Generation Partnership Project; Technical Specification Group Radio Access Network; Radio Resource Control (RRC); Protocol specification (Release 12)," 3GPP TS 2S.331 V12.4.0, 3rd Generation Partnership Project, Valbonne, France (Dec. 2014).

"3rd Generation Partnership Project; Technical Specification Group Radio Access Network; Study on Further Enhanced Uplink (EUL) enhancements (Release 12)," 3GPP TR 25.700 V12.0.0, 3rd Generation Partnership Project, Valbonne, France (Dec. 2013).

"DTX E-DPCCH when Power Scaling in Multi-RAB," 3GPP TSG-RAN1 Meeting #72, St Julian's, Malta, R1-130608, Change Request 25.214 CR 0704 Current version: 11.4.0, 3rd Generation Partnership Project, Valbonne, France (Jan. 28-Feb. 1, 2013).

"TP on conclusions for reduced UL control channel overhead," 3GPP TSG RAN WG1 Meeting #75 R1-135863, San Francisco, USA, 3rd Generation Partnership Project, Valbonne, France (Nov. 11-15, 2013).

"DTX HS-DPCCH for multi-RAB scenario," 3GPP TSG RAN WG1 Meeting #76, Prague, Czech Republic, R1-140690, 3rd Generation Partnership Project, Valbonne, France (Feb. 10-14, 2014).

"HS-DPCCH Overhead Reduction," 3GPP TSG RAN WG1 Meeting #76, Prague, Czech Republic, R1-140712, 3rd Generation Partnership Project, Valbonne, France (Feb. 10-14, 2014).

"New Work Item proposal: Further EUL enhancements," 3GPP TSG RAN Meeting #62, Busan, Korea RP-132078, 3rd Generation Partnership Project, Valbonne, France (Dec. 3-6, 2013).

"New Work Item proposal: Further EUL enhancements—Performance," 3GPP TSG RAN Meeting #62, Busan, Korea RP-132078, 3rd Generation Partnership Project, Valbonne, France (Dec. 3-6, 2013).

CN201580001150.7, Office Action, dated Nov. 2, 2018.

* cited by examiner

METHOD AND APPARATUS FOR CONTROLLING TRANSMIT POWER OF USER EQUIPMENT

CROSS-REFERENCE TO RELATED APPLICATIONS

This application is a continuation of International Application No. PCT/CN2015/070845, filed on Jan. 16, 2015, the disclosure of which is hereby incorporated by reference in its entirety.

TECHNICAL FIELD

The present invention relates to the field of communications, and in particular, to a method and an apparatus for controlling transmit power of user equipment.

BACKGROUND

In a wideband code division multiple access (WCDMA) system, one or more transmission technologies, such as an R99 transmission technology and a high speed downlink packet access (HSDPA) transmission technology, may be configured for one user equipment (UE). An uplink transmit channel in the R99 transmission technology mainly includes a dedicated physical control channel (DPCCH). An uplink transmit channel in the HSDPA transmission technology mainly includes a high speed dedicated physical control channel (HS-DPCCH). The user equipment sends data to a network side by using a configured transmission technology, to implement communication between the user equipment and the network side. However, when transmit power at which the user equipment sends data to the network side is relatively high, quality of data sent by the user equipment is affected, and other users are interfered; therefore, transmit power of the user equipment needs to be controlled.

At present, a process of controlling transmit power of user equipment may be: calculating, by the user equipment, a gain factor of an HS-DPCCH according to a gain factor of a DPCCH and a ratio between the gain factor of the HS-DPCCH and the gain factor of the DPCCH; calculating total uplink transmit power of the user equipment according to the gain factor of the DPCCH and the gain factor of the HS-DPCCH; and when the total uplink transmit power of the user equipment exceeds maximum allowed transmit power, reducing the gain factor of the HS-DPCCH according to the maximum allowed transmit power, to reduce transmit power of the HS-DPCCH, so that the total uplink transmit power of the user equipment does not exceed the maximum allowed transmit power.

Because the user equipment communicates with the network side by using a cell accessed by the user equipment, when the user equipment is in a soft handover area, which is an overlap coverage area of multiple cells, the network side may further configure a dedicated physical control channel 2 (DPCCH2) for the user equipment. In this case, if the user equipment still reduces the gain factor of the HS-DPCCH according to the foregoing method by using the gain factor of the DPCCH, a calculation error occurs; as a result, control accuracy of transmit power is reduced.

SUMMARY

To improve control accuracy of transmit power, embodiments of the present invention provide a method and an apparatus for controlling transmit power of user equipment. The technical solutions are as follows:

According to a first aspect, an apparatus for controlling transmit power of user equipment is provided, including:

a calculation module, configured to: when total uplink transmit power of user equipment UE exceeds maximum allowed transmit power, calculate a first gain factor according to the maximum allowed transmit power;

a processing module, configured to perform quantization processing on the first gain factor according to a gain factor of a first physical channel, to obtain a second gain factor, where the first physical channel includes a dedicated physical control channel 2 DPCCH2; and a reduction module, configured to reduce a gain factor of a second physical channel to the second gain factor, to reduce transmit power of the second physical channel, so that the total uplink transmit power of the user equipment does not exceed the maximum allowed transmit power, where the second physical channel includes a high speed dedicated physical control channel HS-DPCCH.

With reference to the first aspect, in a first possible implementation manner of the first aspect, the calculation module includes:

a first calculation unit, configured to subtract transmit power of remaining uplink channels from the maximum allowed transmit power, to obtain a first numerical value, where the remaining uplink channels are uplink channels among uplink channels, except the second physical channel, of the user equipment; and a second calculation unit, configured to calculate the first gain factor according to the first numerical value.

With reference to the first possible implementation manner of the first aspect, in a second possible implementation manner of the first aspect, the second calculation unit includes:

a first calculation subunit, configured to divide the first numerical value by transmit power of the first physical channel, to obtain a second numerical value; and a second calculation subunit, configured to multiply the second numerical value by the gain factor of the first physical channel, to obtain the first gain factor.

With reference to the first aspect, in a third possible implementation manner of the first aspect, the calculation module includes:

a third calculation unit, configured to multiply the maximum allowed transmit power by a first preset coefficient, to obtain a maximum gain factor; and a fourth calculation unit, configured to subtract a remaining gain factor from the maximum gain factor, to obtain the first gain factor, where the remaining gain factor is the sum of gain factors of the remaining uplink channels.

With reference to the first aspect, in a fourth possible implementation manner of the first aspect, the processing module includes:

a processing unit, configured to: if a second ratio is greater than or equal to a smallest value among multiple preset quantitative ratios, perform quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and a setting unit, configured to: if the second ratio is less than the smallest value among the multiple preset quantitative ratios, set the second gain factor to 0.

With reference to the fourth possible implementation manner of the first aspect, in a fifth possible implementation manner of the first aspect, the processing unit includes:

a third calculation subunit, configured to multiply each of the multiple preset quantitative ratios by the gain factor of the first physical channel, to obtain multiple second numerical values;

a first selection subunit, configured to select, from the multiple second numerical values, second numerical values that are less than or equal to the first gain factor; and a determining subunit, configured to determine a greatest value among the selected second numerical values as the second gain factor.

With reference to the fourth possible implementation manner of the first aspect, in a sixth possible implementation manner of the first aspect, the processing unit includes:

a second selection subunit, configured to select, from the multiple preset quantitative ratios, preset quantitative ratios that are less than or equal to the second ratio; and a fourth calculation subunit, configured to multiply a greatest value among the selected preset quantitative ratios by the gain factor of the first physical channel, to obtain the second gain factor.

With reference to the fourth possible implementation manner of the first aspect, in a seventh possible implementation manner of the first aspect, the setting unit includes:

a setting subunit, configured to: if the second ratio is less than the smallest value among the multiple preset quantitative ratios and a current timeslot of the user equipment is a timeslot that is used to transmit channel quality indicator CQI information of the second physical control channel, set the second gain factor to 0.

According to a second aspect, an apparatus for controlling transmit power of user equipment is provided, including:

a processor, configured to: when total uplink transmit power of user equipment UE exceeds maximum allowed transmit power, calculate a first gain factor according to the maximum allowed transmit power, where the processor is further configured to perform quantization processing on the first gain factor according to a gain factor of a first physical channel, to obtain a second gain factor, where the first physical channel includes a dedicated physical control channel 2 DPCCH2; and the processor is further configured to reduce a gain factor of a second physical channel to the second gain factor, to reduce transmit power of the second physical channel, so that the total uplink transmit power of the user equipment does not exceed the maximum allowed transmit power, where the second physical channel includes a high speed dedicated physical control channel HS-DPCCH.

With reference to the second aspect, in a first possible implementation manner of the second aspect, the processor is further configured to subtract transmit power of remaining uplink channels from the maximum allowed transmit power, to obtain a first numerical value, where the remaining uplink channels are uplink channels among uplink channels, except the second physical channel, of the user equipment; and the processor is further configured to calculate the first gain factor according to the first numerical value.

With reference to the first possible implementation manner of the second aspect, in a second possible implementation manner of the second aspect, the processor is further configured to divide the first numerical value by transmit power of the first physical channel, to obtain a second numerical value; and the processor is further configured to multiply the second numerical value by the gain factor of the first physical channel, to obtain the first gain factor.

With reference to the second aspect, in a third possible implementation manner of the second aspect, the processor is further configured to multiply the maximum allowed transmit power by a first preset coefficient, to obtain a maximum gain factor; and the processor is further configured to subtract a remaining gain factor from the maximum gain factor, to obtain the first gain factor, where the remaining gain factor is the sum of gain factors of the remaining uplink channels.

With reference to the second aspect, in a fourth possible implementation manner of the second aspect, the processor is further configured to: if a second ratio is greater than or equal to a smallest value among multiple preset quantitative ratios, perform quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and the processor is further configured to: if the second ratio is less than the smallest value among the multiple preset quantitative ratios, set the second gain factor to 0.

With reference to the fourth possible implementation manner of the second aspect, in a fifth possible implementation manner of the second aspect, the processor is further configured to multiply each of the multiple preset quantitative ratios by the gain factor of the first physical channel, to obtain multiple second numerical values;

the processor is further configured to select, from the multiple second numerical values, second numerical values that are less than or equal to the first gain factor; and the processor is further configured to determine a greatest value among the selected second numerical values as the second gain factor.

With reference to the fourth possible implementation manner of the second aspect, in a sixth possible implementation manner of the second aspect, the processor is further configured to select, from the multiple preset quantitative ratios, preset quantitative ratios that are less than or equal to the second ratio; and the processor is further configured to multiply a greatest value among the selected preset quantitative ratios by the gain factor of the first physical channel, to obtain the second gain factor.

With reference to the fourth possible implementation manner of the second aspect, in a seventh possible implementation manner of the second aspect, the processor is further configured to: if the second ratio is less than the smallest value among the multiple preset quantitative ratios and a current timeslot of the user equipment is a timeslot that is used to transmit channel quality indicator CQI information of the second physical control channel, set the second gain factor to 0.

According to a third aspect, a method for controlling transmit power of user equipment is provided, including:

when total uplink transmit power of user equipment UE exceeds maximum allowed transmit power, calculating a first gain factor according to the maximum allowed transmit power;

performing quantization processing on the first gain factor according to a gain factor of a first physical channel, to obtain a second gain factor, where the first physical channel includes a dedicated physical control channel 2 DPCCH2; and reducing a gain factor of a second physical channel to the second gain factor, to reduce transmit power of the second physical channel, so that the total uplink transmit power of the user equipment does not exceed the maximum allowed transmit power, where the second physical channel includes a high speed dedicated physical control channel HS-DP-CCH.

With reference to the third aspect, in a first possible implementation manner of the third aspect, the calculating a first gain factor according to the maximum allowed transmit power includes:

subtracting transmit power of remaining uplink channels from the maximum allowed transmit power, to obtain a first numerical value, where the remaining uplink channels are uplink channels among uplink channels, except the second physical channel, of the user equipment; and calculating the first gain factor according to the first numerical value.

With reference to the first possible implementation manner of the third aspect, in a second possible implementation manner of the third aspect, the calculating the first gain factor according to the first numerical value includes:

dividing the first numerical value by transmit power of the first physical channel, to obtain a second numerical value; and multiplying the second numerical value by the gain factor of the first physical channel, to obtain the first gain factor.

With reference to the third aspect, in a third possible implementation manner of the third aspect, the calculating a first gain factor according to the maximum allowed transmit power includes:

multiplying the maximum allowed transmit power by a first preset coefficient, to obtain a maximum gain factor; and subtracting a remaining gain factor from the maximum gain factor, to obtain the first gain factor, where the remaining gain factor is the sum of gain factors of the remaining uplink channels.

With reference to the third aspect, in a fourth possible implementation manner of the third aspect, the performing quantization processing on the first gain factor according to a gain factor of a first physical channel, to obtain a second gain factor includes:

if a second ratio is greater than or equal to a smallest value among multiple preset quantitative ratios, performing quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and setting the second gain factor to 0 if the second ratio is less than the smallest value among the multiple preset quantitative ratios.

With reference to the fourth possible implementation manner of the third aspect, in a fifth possible implementation manner of the third aspect, the performing quantization processing on the first gain factor according to the gain factor of the first physical channel and the multiple preset quantitative ratios, to obtain the second gain factor includes:

multiplying each of the multiple preset quantitative ratios by the gain factor of the first physical channel, to obtain multiple second numerical values;

selecting, from the multiple second numerical values, second numerical values that are less than or equal to the first gain factor; and determining a greatest value among the selected second numerical values as the second gain factor.

With reference to the fourth possible implementation manner of the third aspect, in a sixth possible implementation manner of the third aspect, the performing quantization processing on the first gain factor according to the gain factor of the first physical control channel and the multiple preset quantitative ratios, to obtain the second gain factor includes:

selecting, from the multiple preset quantitative ratios, preset quantitative ratios that are less than or equal to the second ratio; and multiplying a greatest value among the selected preset quantitative ratios by the gain factor of the first physical channel, to obtain the second gain factor.

With reference to the fourth possible implementation manner of the third aspect, in a seventh possible implementation manner of the third aspect, the setting the second gain factor to 0 if the second ratio is less than the smallest value among the multiple preset quantitative ratios includes:

if the second ratio is less than the smallest value among the multiple preset quantitative ratios and a current timeslot of the user equipment is a timeslot that is used to transmit channel quality indicator CQI information of the second physical control channel, setting the second gain factor to 0.

In the embodiments of the present invention, when a network side configures a DPCCH2 for user equipment, a first physical channel is the DPCCH2, and a second physical channel is an HS-DPCCH, because transmit power of the HS-DPCCH is related to transmit power of the DPCCH2, a gain factor of the HS-DPCCH is reduced by using a gain factor of the DPCCH2, so as to reduce the transmit power of the HS-DPCCH. This reduces a calculation error and improves control accuracy of transmit power.

BRIEF DESCRIPTION OF DRAWINGS

To describe technical solutions in embodiments of the present invention more clearly, the following briefly introduces the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present invention clearer, the following further describes the embodiments of the present invention in detail with reference to the accompanying drawings.

Before embodiments of the present invention are described and explained in detail, terms involved in the embodiments of the present invention are explained first, and an application scenario of the embodiments of the present invention is described.

Active set: a set of one or more cells that have established a connection to user equipment. Each user equipment has a corresponding active set, and all cells in the active set can perform control on the user equipment.

Soft handover (SHO) area: an overlap coverage area of at least two cells. Correspondingly, when the user equipment is in a soft handover area, an active set of the user equipment includes at least two cells.

When user equipment is in a soft handover area, a network side may configure a DPCCH and a DPCCH2 for the user equipment, and an active set of the user equipment includes at least two cells. When an HSDPA service is configured for the user equipment, the active set of the user equipment may include a serving cell that serves a high-speed downlink shared channel (HS-DSCH), where the HS-DSCH is a transport channel, and is used to carry actual user data in the HSDPA service. Transmit power of the DPCCH is controlled by all cells in the active set that corresponds to the user equipment, and transmit power of the DPCCH2 is controlled by the serving cell in the active set that corresponds to the user equipment; therefore, the transmit power of the DPCCH and the transmit power of the DPCCH2 vary independently. In addition, when the user equipment is in the soft handover area, and the network side configures the DPCCH2 for the user equipment, transmit power of an HS-DPCCH is related to the transmit power of the DPCCH2 but is not related to the transmit power of the DPCCH, that is, a gain factor of the HS-DPCCH is related to a gain factor of the DPCCH2 but is not related to a gain factor of the DPCCH. A calculation error occurs when the gain factor of the HS-DPCCH is reduced by using the gain factor of the DPCCH, and when the gain factor of the DPCCH2 is far greater than the gain factor of the DPCCH, the calculation error is greater. Therefore, the embodiments of the present invention provide a method for controlling transmit power of user equipment, which can reduce a calculation error, thereby improving control accuracy of transmit power.

Figure 1:
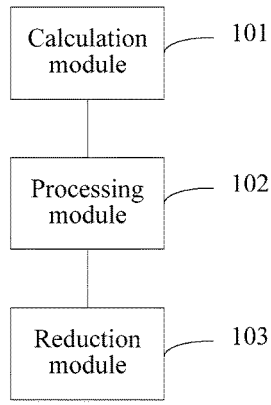
FIG. 1 is a schematic structural diagram of an apparatus for controlling transmit power of user equipment according to an embodiment of the present invention.

FIG. 1 is a schematic structural diagram of an apparatus for controlling transmit power of user equipment according to an embodiment of the present invention. Referring to FIG. 1, the apparatus includes: a calculation module 101, a processing module 102, and a reduction module 103.

The calculation module 101 is configured to: when total uplink transmit power of user equipment exceeds maximum allowed transmit power, calculate a first gain factor according to the maximum allowed transmit power.

The processing module 102 is configured to perform quantization processing on the first gain factor according to a gain factor of a first physical channel, to obtain a second gain factor, where the first physical channel includes a DPCCH2.

The reduction module 103 is configured to reduce a gain factor of a second physical channel to the second gain factor, to reduce transmit power of the second physical channel, so that the total uplink transmit power of the user equipment does not exceed the maximum allowed transmit power, where the second physical channel includes an HS-DPCCH.

In this embodiment of the present invention, when a network side configures a DPCCH2 for user equipment, a first physical channel is the DPCCH2, and a second physical channel is an HS-DPCCH, because transmit power of the HS-DPCCH is related to transmit power of the DPCCH2, a gain factor of the HS-DPCCH is reduced by using a gain factor of the DPCCH2, so as to reduce the transmit power of the HS-DPCCH. This reduces a calculation error and improves control accuracy of transmit power.

Optionally, the calculation module 101 includes:
a first calculation unit, configured to subtract transmit power of remaining uplink channels from the maximum allowed transmit power, to obtain a first numerical value, where the remaining uplink channels are uplink channels among uplink channels, except the second physical channel, of the user equipment; and
a second calculation unit, configured to calculate the first gain factor according to the first numerical value.

Optionally, the second calculation unit includes:
a first calculation subunit, configured to divide the first numerical value by transmit power of the first physical channel, to obtain a second numerical value; and
a second calculation subunit, configured to multiply the second numerical value by the gain factor of the first physical channel, to obtain the first gain factor.

Optionally, the calculation module 101 includes:
a third calculation unit, configured to multiply the maximum allowed transmit power by a first preset coefficient, to obtain a maximum gain factor; and
a fourth calculation unit, configured to subtract a remaining gain factor from the maximum gain factor, to obtain the first gain factor, where the remaining gain factor is the sum of gain factors of the remaining uplink channels.

Optionally, the processing module 102 includes:
a processing unit, configured to: if a second ratio is greater than or equal to a smallest value among multiple preset quantitative ratios, perform quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and
a setting unit, configured to: if the second ratio is less than the smallest value among the multiple preset quantitative ratios, set the second gain factor to 0.

Optionally, the processing unit includes:
a third calculation subunit, configured to multiply each of the multiple preset quantitative ratios by the gain factor of the first physical channel, to obtain multiple second numerical values;
a first selection subunit, configured to select, from the multiple second numerical values, second numerical values that are less than or equal to the first gain factor; and
a determining subunit, configured to determine a greatest value among the selected second numerical values as the second gain factor.

Optionally, the processing unit includes:

a second selection subunit, configured to select, from the multiple preset quantitative ratios, preset quantitative ratios that are less than or equal to the second ratio; and a fourth calculation subunit, configured to multiply a greatest value among the selected preset quantitative ratios by the gain factor of the first physical channel, to obtain the second gain factor.

Optionally, the setting unit includes:

a setting subunit, configured to: if the second ratio is less than the smallest value among the multiple preset quantitative ratios and a current timeslot of the user equipment is a timeslot that is used to transmit channel quality indicator (CQI) information of the second physical control channel, set the second gain factor to 0.

Any combination of the foregoing optional technical solutions can form an optional embodiment of the present invention, and no further details are described in this embodiment of the present invention.

Figure 2:
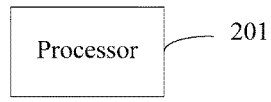
FIG. 2 is a schematic structural diagram of another apparatus for controlling transmit power of user equipment according to an embodiment of the present invention.

FIG. 2 is a schematic structural diagram of an apparatus for controlling transmit power of user equipment according to an embodiment of the present invention. Referring to FIG. 2, the apparatus includes a processor 201.

The processor 201 is configured to: when total uplink transmit power of user equipment exceeds maximum allowed transmit power, calculate a first gain factor according to the maximum allowed transmit power.

The processor 201 is further configured to perform quantization processing on the first gain factor according to a gain factor of a first physical channel, to obtain a second gain factor, where the first physical channel includes a DPCCH2.

The processor 201 is further configured to reduce a gain factor of a second physical channel to the second gain factor, to reduce transmit power of the second physical channel, so that the total uplink transmit power of the user equipment does not exceed the maximum allowed transmit power, where the second physical channel includes an HS-DPCCH.

Optionally, the processor 201 is further configured to subtract transmit power of remaining uplink channels from the maximum allowed transmit power, to obtain a first numerical value, where the remaining uplink channels are uplink channels among uplink channels, except the second physical channel, of the user equipment; and the processor 201 is further configured to calculate the first gain factor according to the first numerical value.

Optionally, the processor 201 is further configured to divide the first numerical value by transmit power of the first physical channel, to obtain a second numerical value; and the processor 201 is further configured to multiply the second numerical value by the gain factor of the first physical channel, to obtain the first gain factor.

Optionally, the processor 201 is further configured to multiply the maximum allowed transmit power by a first preset coefficient, to obtain a maximum gain factor; and the processor 201 is further configured to subtract a remaining gain factor from the maximum gain factor, to obtain the first gain factor, where the remaining gain factor is the sum of gain factors of the remaining uplink channels.

Optionally, the processor 201 is further configured to: if a second ratio is greater than or equal to a smallest value among multiple preset quantitative ratios, perform quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and the processor 201 is further configured to: if the second ratio is less than the smallest value among the multiple preset quantitative ratios, set the second gain factor to 0.

Optionally, the processor 201 is further configured to multiply each of the multiple preset quantitative ratios by the gain factor of the first physical channel, to obtain multiple second numerical values;

the processor 201 is further configured to select, from the multiple second numerical values, second numerical values that are less than or equal to the first gain factor; and the processor 201 is further configured to determine a greatest value among the selected second numerical values as the second gain factor.

Optionally, the processor 201 is further configured to select, from the multiple preset quantitative ratios, preset quantitative ratios that are less than or equal to the second ratio; and the processor 201 is further configured to multiply a greatest value among the selected preset quantitative ratios by the gain factor of the first physical channel, to obtain the second gain factor.

Optionally, the processor 201 is further configured to: if the second ratio is less than the smallest value among the multiple preset quantitative ratios and a current timeslot of the user equipment is a timeslot that is used to transmit CQI information of the second physical control channel, set the second gain factor to 0.

In this embodiment of the present invention, when a network side configures a DPCCH2 for user equipment, a first physical channel is the DPCCH2, and a second physical channel is an HS-DPCCH, because transmit power of the HS-DPCCH is related to transmit power of the DPCCH2, a gain factor of the HS-DPCCH is reduced by using a gain factor of the DPCCH2, so as to reduce the transmit power of the HS-DPCCH. This reduces a calculation error and improves control accuracy of transmit power.

Figure 3:
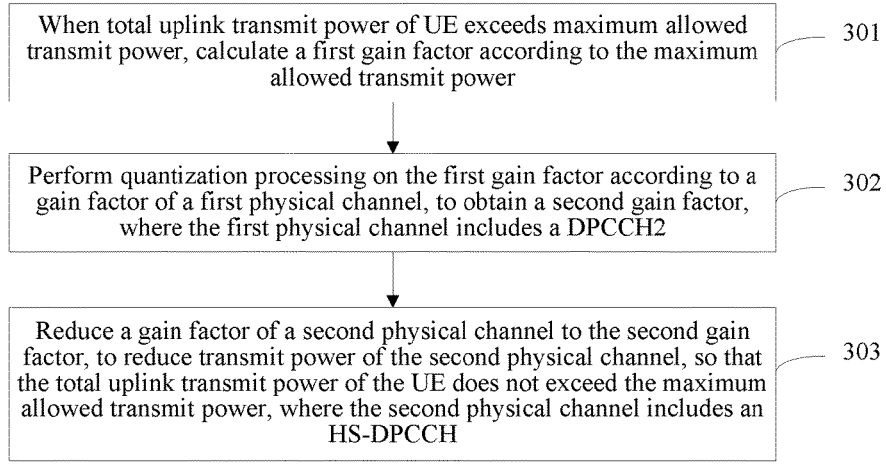
FIG. 3 is a flowchart of a method for controlling transmit power of user equipment according to an embodiment of the present invention.

FIG. 3 is a flowchart of a method for controlling transmit power of user equipment according to an embodiment of the present invention. Referring to FIG. 3, the method includes:

Step 301: When total uplink transmit power of user equipment exceeds maximum allowed transmit power, calculate a first gain factor according to the maximum allowed transmit power.

Step 302: Perform quantization processing on the first gain factor according to a gain factor of a first physical channel, to obtain a second gain factor, where the first physical channel includes a DPCCH2.

Step 303: Reduce a gain factor of a second physical channel to the second gain factor, to reduce transmit power of the second physical channel, so that the total uplink transmit power of the user equipment does not exceed the maximum allowed transmit power, where the second physical channel includes an HS-DPCCH.

In this embodiment of the present invention, when a network side configures a DPCCH2 for user equipment, a first physical channel is the DPCCH2, and a second physical channel is an HS-DPCCH, because transmit power of the HS-DPCCH is related to transmit power of the DPCCH2, a gain factor of the HS-DPCCH is reduced by using a gain factor of the DPCCH2, so as to reduce the transmit power of the HS-DPCCH. This reduces a calculation error and improves control accuracy of transmit power.

Optionally, the calculating a first gain factor according to the maximum allowed transmit power includes:

subtracting transmit power of remaining uplink channels from the maximum allowed transmit power, to obtain a first numerical value, where the remaining uplink channels are uplink channels among uplink channels, except the second physical channel, of the user equipment; and calculating the first gain factor according to the first numerical value.

Optionally, the calculating the first gain factor according to the first numerical value includes:

dividing the first numerical value by transmit power of the first physical channel, to obtain a second numerical value; and multiplying the second numerical value by the gain factor of the first physical channel, to obtain the first gain factor.

Optionally, the calculating a first gain factor according to the maximum allowed transmit power includes:

multiplying the maximum allowed transmit power by a first preset coefficient, to obtain a maximum gain factor; and subtracting a remaining gain factor from the maximum gain factor, to obtain the first gain factor, where the remaining gain factor is the sum of gain factors of the remaining uplink channels.

Optionally, the performing quantization processing on the first gain factor according to a gain factor of a first physical channel, to obtain a second gain factor includes:

if a second ratio is greater than or equal to a smallest value among multiple preset quantitative ratios, performing quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel, and the second ratio is a ratio between the first gain factor and the gain factor of the first physical channel; and setting the second gain factor to 0 if the second ratio is less than the smallest value among the multiple preset quantitative ratios.

Optionally, the performing quantization processing on the first gain factor according to the gain factor of the first physical channel and the multiple preset quantitative ratios, to obtain the second gain factor includes:

multiplying each of the multiple preset quantitative ratios by the gain factor of the first physical channel, to obtain multiple second numerical values;

selecting, from the multiple second numerical values, second numerical values that are less than or equal to the first gain factor; and determining a greatest value among the selected second numerical values as the second gain factor.

Optionally, the performing quantization processing on the first gain factor according to the gain factor of the first physical control channel and the multiple preset quantitative ratios, to obtain the second gain factor includes:

selecting, from the multiple preset quantitative ratios, preset quantitative ratios that are less than or equal to the second ratio; and multiplying a greatest value among the selected preset quantitative ratios by the gain factor of the first physical channel, to obtain the second gain factor.

Optionally, the setting the second gain factor to 0 if the second ratio is less than the smallest value among the multiple preset quantitative ratios includes:

if the second ratio is less than the smallest value among the multiple preset quantitative ratios and a current timeslot of the user equipment is a timeslot that is used to transmit CQI information of the second physical control channel, setting the second gain factor to 0.

Any combination of the foregoing optional technical solutions can form an optional embodiment of the present invention, and no further details are described in this embodiment of the present invention.

Figure 4:
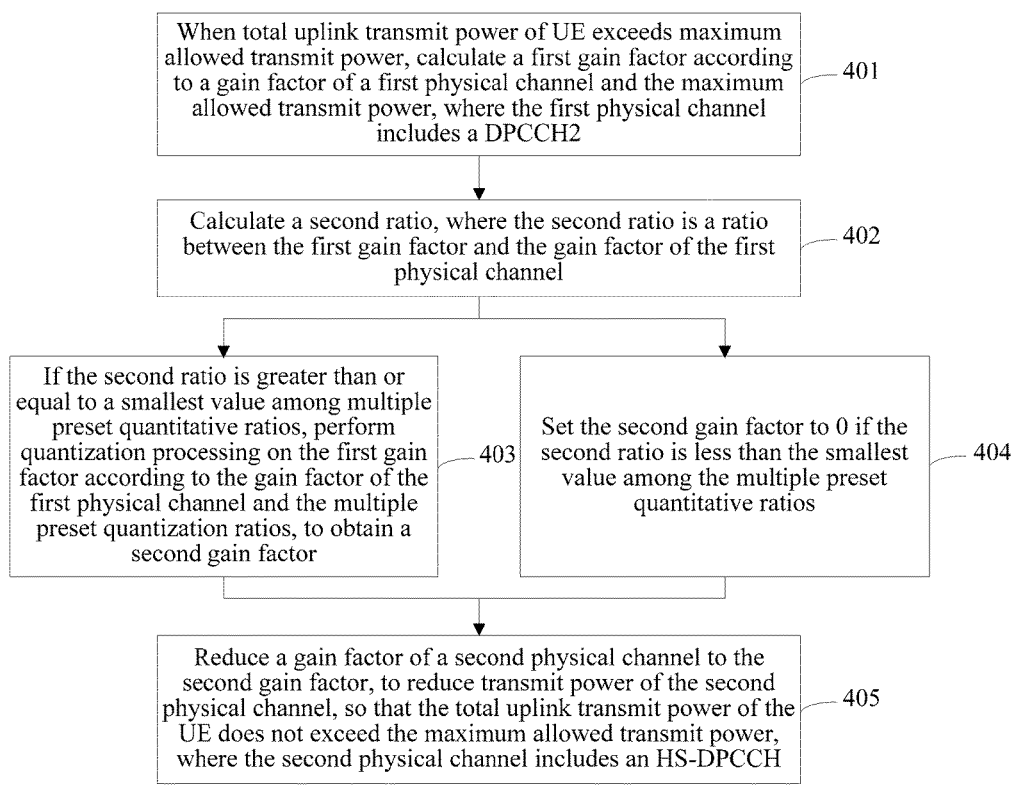
FIG. 4 is a flowchart of another method for controlling transmit power of user equipment according to an embodiment of the present invention.

FIG. 4 is a flowchart of a method for controlling transmit power of user equipment according to an embodiment of the present invention. Referring to FIG. 4, the method includes:

Step 401: When total uplink transmit power of user equipment exceeds maximum allowed transmit power, calculate a first gain factor according to a gain factor of a first physical channel and the maximum allowed transmit power, where the first physical channel includes a DPCCH2.

When the total uplink transmit power of the user equipment exceeds the maximum allowed transmit power, quality of data transmitted by the user equipment to a network side is affected, and other users are interfered; therefore, the user equipment may determine the total uplink transmit power of the user equipment in real time. When the total uplink transmit power of the user equipment exceeds the maximum allowed transmit power, transmit power of uplink channels of the user equipment needs to be reduced. The uplink channels of the user equipment not only includes a DPCCH, an HS-DPCCH, and a DPCCH2, but may also include other uplink channels, such as a dedicated physical date channel (DPDCH), an Enhanced Dedicated Channel (E-DCH) dedicated physical date channel (E-DPDCH), and an E-DCH dedicated physical control channel (E-DPDCH). Only reduction of transmit power of an HS-DPCCH is described in detail in this embodiment of the present invention.

A gain factor is a ratio between transmit power of a channel and input transmit power, and a gain factor of a channel is in direct proportion to transmit power of the channel. When a DPCCH2 is configured, an HS-DPCCH and the DPCCH2 have same input transmit power, for example, the input transmit power is transmit power of the DPCCH2. In addition, in this embodiment of the present invention, when the user equipment is in a soft handover area and after the network side configures the DPCCH2 for the user equipment, a gain factor of the HS-DPCCH is related to a gain factor of the DPCCH2. Therefore, to improve control accuracy of transmit power, in this embodiment of the present invention, the gain factor of the HS-DPCCH is reduced by using the gain factor of the DPCCH2, so as to reduce transmit power of the HS-DPCCH.

In addition, in a process of reducing the gain factor of the HS-DPCCH by using the gain factor of the DPCCH2, the user equipment needs to calculate the first gain factor according to the gain factor of the first physical channel and the maximum allowed transmit power; the user equipment may calculate the first gain factor according to the gain factor of the first physical channel and the maximum allowed transmit power in two manners.

A first manner is: subtracting transmit power of remaining uplink channels from the maximum allowed transmit power, to obtain a first numerical value, where the remaining uplink channels are uplink channels among uplink channels, except a second physical channel, of the user equipment; and calculating the first gain factor according to the first numerical value.

The calculating the first gain factor according to the first numerical value includes: dividing the first numerical value by transmit power of the first physical channel, to obtain a second numerical value, and multiplying the second numerical value by the gain factor of the first physical channel, to obtain the first gain factor; or multiplying the first numerical value by a second preset coefficient, to obtain the first gain factor.

It should be noted that the maximum allowed transmit power may be pre-configured by the network side, and the gain factor of the first physical channel may also be pre-configured by the network side, or the maximum allowed transmit power and the gain factor of the first physical channel may be predefined by the user equipment, which is not specifically limited in this embodiment of the present invention. In addition, the second preset coefficient may also be pre-configured by the network side, or may be predefined by the user equipment, which is not specifically limited in this embodiment of the present invention either.

A second manner is: multiplying the maximum allowed transmit power by a first preset coefficient, to obtain a maximum gain factor; and subtracting a remaining gain factor from the maximum gain factor, to obtain the first gain factor, where the remaining gain factor is the sum of gain factors of the remaining uplink channels.

It should be noted that the first preset coefficient may be pre-configured by the network side, or may be predefined by the user equipment, which is not specifically limited in this embodiment of the present invention.

Step 402: Calculate a second ratio, where the second ratio is a ratio between the first gain factor and the gain factor of the first physical channel.

Specifically, the first gain factor is divided by the gain factor of the first physical channel to obtain the second ratio. For example, the first gain factor is 50, and the gain factor of the first physical channel is 100. The first gain factor 50 is divided by the gain factor 100 of the first physical channel, to obtain that the second ratio is 0.5.

Step 403: If the second ratio is greater than or equal to a smallest value among multiple preset quantitative ratios, perform quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, where the first ratio is a ratio between the second gain factor and the gain factor of the first physical channel.

For example, the user equipment stores a correspondence, shown in Table 1 below, between quantization indicator values and preset quantitative ratios. The user equipment acquires multiple preset quantitative ratios from the correspondence. A smallest value among the multiple preset quantitative ratios is a preset quantitative ratio 5/15=0.33 corresponding to a quantization indicator value 0, and the second ratio 0.5 is greater than the smallest value 0.33. Therefore, the user equipment may perform quantization processing on the first gain factor 50 according to the gain factor 100 of the first physical channel and the multiple preset quantitative ratios.

TABLE 1

| Quantization indicator value | Preset quantitative ratio |
| --- | --- |
| 12 | 76/15 |
| 11 | 60/15 |
| 10 | 48/15 |
| 9 | 38/15 |
| 8 | 30/15 |
| 7 | 24/15 |
| 6 | 19/15 |
| 5 | 15/15 |

TABLE 1-continued

| Quantization indicator value | Preset quantitative ratio |
| --- | --- |
| 4 | 12/15 |
| 3 | 9/15 |
| 2 | 8/15 |
| 1 | 6/15 |
| 0 | 5/15 |

There are two manners of performing quantization processing on the first gain factor according to the gain factor of the first physical channel and the multiple preset quantitative ratios, to obtain the second gain factor.

A first manner is: multiplying each of the multiple preset quantitative ratios by the gain factor of the first physical channel, to obtain multiple second numerical values; selecting, from the multiple second numerical values, second numerical values that are less than or equal to the first gain factor; and determining a greatest value among the selected second numerical values as the second gain factor.

For example, each of the multiple preset quantitative ratios is multiplied by the gain factor 100 of the first physical channel, to obtain that the multiple second numerical values are: 506.67, 400, 320, 253.33, 200, 160, 126.67, 100, 80, 60, 53.33, 40, and 33.33; second numerical values 40 and 33.33 that are less than or equal to the first gain factor 50 are selected from the multiple second numerical values; and 40 is determined as the second gain factor.

A second manner is: selecting, from the multiple preset quantitative ratios, preset quantitative ratios that are less than or equal to the second ratio; and multiplying a greatest value among the selected preset quantitative ratios by the gain factor of the first physical channel, to obtain the second gain factor.

For example, the second ratio is 0.5, preset quantitative ratios 6/15 and 5/15 that are less than or equal to the second ratio are selected from the multiple preset quantitative ratios, and a larger value 6/15 of the selected preset quantitative ratios is multiplied by the gain factor 100 of the first physical channel, to obtain that the second gain factor is 40.

It should be noted that in this embodiment of the present invention, the multiple preset quantitative ratios shown in Table 1 above are merely used as an example for description. In an actual application, more preset quantitative ratios may further be set, and differences between the multiple preset quantitative ratios are relatively small. In this case, when quantization processing is performed on the first gain factor according to the method provided in this embodiment of the present invention, a quantization error is further reduced.

Step 404: Set the second gain factor to 0 if the second ratio is less than the smallest value among the multiple preset quantitative ratios.

Further, when the second ratio is less than the smallest value among the multiple preset quantitative ratios and a current timeslot of the user equipment is a timeslot that is used to transmit channel quality indicator CQI for short) information of the second physical control channel, the second gain factor is set to 0.

Optionally, limiting conditions in step 403 and step 404 may be obtained through determining by using the second ratio and the smallest value among the multiple preset quantitative ratios before the user equipment performs quantization processing on the first gain factor, or may be obtained in a process in which the user equipment performs quantization processing on the first gain factor. For example, in a process in which the user equipment performs quantization processing on the first gain factor according to the gain factor of the first physical channel and the multiple preset quantitative ratios, if the user equipment can find, among the multiple preset quantitative ratios, a greatest preset quantitative ratio that does not exceed the second ratio, it is determined that the second ratio is greater than or equal to the smallest value among the multiple preset quantitative ratios, and the second gain factor is calculated according to the greatest preset quantitative ratio. If no greatest preset quantitative ratio that does not exceed the second ratio can be found among the multiple preset quantitative ratios, it is determined that the second ratio is less than the smallest value among the multiple preset quantitative ratios, and the second gain factor is set to 0. In this embodiment of the present invention, sequential order of a process of determining a value relationship between the second ratio and the smallest value among the multiple preset quantitative ratios is not specifically limited.

Step 405: Reduce a gain factor of a second physical channel to the second gain factor, to reduce transmit power of the second physical channel, so that the total uplink transmit power of the user equipment does not exceed the maximum allowed transmit power, where the second physical channel includes an HS-DPCCH.

Because a gain factor of a channel is related to transmit power of the channel, and the gain factor of the channel is in direct proportion to the transmit power of the channel, when the gain factor of the second physical channel is reduced, it is equivalent to that the transmit power of the second physical channel is reduced, so that the total uplink transmit power of the user equipment does not exceed the maximum allowed transmit power.

In addition, in another embodiment of the present invention, an operation of reducing a gain factor of a second physical channel to the second gain factor, to reduce transmit power of the second physical channel may be: calculating a ratio between the second gain factor and the gain factor of the first physical channel, and multiplying the calculated ratio by the transmit power of the first physical channel, to obtain reduced transmit power of the second physical channel.

It should be noted that in this embodiment of the present invention, when the second gain factor is 0 and the current timeslot of the user equipment is a timeslot that is used to transmit the CQI information of the HS-DPCCH, the gain factor of the second physical control channel is reduced to 0, that is, the CQI information of the HS-DPCCH is discontinuous transmitted (DTX).

In addition, the method provided in this embodiment of the present invention not only may be applied to a WCDMA system, but may also be applied to a High Speed Packet Access (HSPA) system, which is not specifically limited in this embodiment of the present invention.

In this embodiment of the present invention, when a network side configures a DPCCH2 for user equipment, a first physical channel is the DPCCH2, and a second physical channel is an HS-DPCCH, because transmit power of the HS-DPCCH is related to transmit power of the DPCCH2, a gain factor of the HS-DPCCH is reduced by using a gain factor of the DPCCH2, so as to reduce the transmit power of the HS-DPCCH. This reduces a calculation error and improves control accuracy of transmit power.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention. Additionally, statements made herein characterizing the invention refer to an embodiment of the invention and not necessarily all embodiments.

What is claimed is:

1. An apparatus for controlling transmit power of user equipment, comprising a processor and a non-transitory computer-readable medium having processor-executable instructions stored thereon, wherein the processor-executable instructions, when executed by the processor, facilitate:
   when total uplink transmit power of a user equipment (UE) exceeds a maximum allowed transmit power, calculating a first gain factor according to the maximum allowed transmit power;
   performing quantization processing on the first gain factor according to a gain factor of a first physical channel, to obtain a second gain factor, wherein the first physical channel comprises a dedicated physical control channel 2 (DPCCH2); and
   reducing a gain factor of a second physical channel to the second gain factor, to reduce transmit power of the second physical channel, so that the total uplink transmit power of the user equipment does not exceed the maximum allowed transmit power, wherein the second physical channel comprises a high speed dedicated physical control channel (HS-DPCCH).

2. The apparatus according to claim 1, wherein calculating the first gain factor further comprises:
   subtracting transmit power of remaining uplink channels from the maximum allowed transmit power, to obtain a first numerical value, wherein the remaining uplink channels are uplink channels of the user equipment except the second physical channel; and
   calculating the first gain factor according to the first numerical value.

3. The apparatus according to claim 2, wherein calculating the first gain factor further comprises:
   dividing the first numerical value by transmit power of the first physical channel, to obtain a second numerical value; and
   multiplying the second numerical value by the gain factor of the first physical channel, to obtain the first gain factor.

4. The apparatus according to claim 1, wherein calculating the first gain factor further comprises:
   multiplying the maximum allowed transmit power by a first preset coefficient, to obtain a maximum gain factor; and
   subtracting a remaining gain factor from the maximum gain factor, wherein the remaining gain factor is the sum of gain factors of remaining uplink channels, wherein the remaining uplink channels are uplink channels of the user equipment except the second physical channel.

5. The apparatus according to claim 1, wherein performing quantization processing on the first gain factor according to the gain factor of the first physical channel comprises:
   if a second ratio is greater than or equal to a smallest value among multiple preset quantitative ratios, performing quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, wherein the first ratio is a ratio between the second gain factor and the gain factor of the first physical channel, and the second ratio is a ratio between the first gain factor and the gain factor of the first physical channel; and if the second ratio is less than the smallest value among the multiple preset quantitative ratios, setting the second gain factor to 0.

6. The apparatus according to claim 5, wherein performing quantization processing on the first gain factor according to the gain factor of the first physical channel and the multiple preset quantitative ratios comprises:

multiplying each of the multiple preset quantitative ratios by the gain factor of the first physical channel, to obtain multiple second numerical values;

selecting, from the multiple second numerical values, second numerical values that are less than or equal to the first gain factor; and determining a greatest value among the selected second numerical values as the second gain factor.

7. The apparatus according to claim 5, wherein performing quantization processing on the first gain factor according to the gain factor of the first physical control channel and the multiple preset quantitative ratios comprises:

selecting, from the multiple preset quantitative ratios, preset quantitative ratios that are less than or equal to the second ratio; and multiplying a greatest value among the selected preset quantitative ratios by the gain factor of the first physical channel, to obtain the second gain factor.

8. The apparatus according to claim 5, wherein setting the second gain factor to 0 is further based on a current timeslot of the user equipment being a timeslot that is used to transmit channel quality indicator (CQI) information of the second physical control channel.

9. A method for controlling transmit power of a user equipment, comprising:

when total uplink transmit power of a user equipment (UE) exceeds a maximum allowed transmit power, calculating, by an apparatus, a first gain factor according to the maximum allowed transmit power;

performing, by the apparatus, quantization processing on the first gain factor according to a gain factor of a first physical channel, to obtain a second gain factor, wherein the first physical channel comprises a dedicated physical control channel 2 (DPCCH2); and reducing, by the apparatus, a gain factor of a second physical channel to the second gain factor, to reduce transmit power of the second physical channel, so that the total uplink transmit power of the user equipment does not exceed the maximum allowed transmit power, wherein the second physical channel comprises a high speed dedicated physical control channel (HS-DP-CCH).

10. The method according to claim 9, wherein calculating the first gain factor according to the maximum allowed transmit power comprises:

subtracting transmit power of remaining uplink channels from the maximum allowed transmit power, to obtain a first numerical value, wherein the remaining uplink channels are uplink channels of the user equipment except the second physical channel; and calculating the first gain factor according to the first numerical value.

11. The method according to claim 10, wherein calculating the first gain factor according to the first numerical value comprises:

dividing the first numerical value by transmit power of the first physical channel, to obtain a second numerical value; and multiplying the second numerical value by the gain factor of the first physical channel, to obtain the first gain factor.

12. The method according to claim 9, wherein calculating the first gain factor according to the maximum allowed transmit power comprises:

multiplying the maximum allowed transmit power by a first preset coefficient, to obtain a maximum gain factor; and subtracting a remaining gain factor from the maximum gain factor, to obtain the first gain factor, wherein the remaining gain factor is the sum of gain factors of remaining uplink channels, wherein the remaining uplink channels are uplink channels of the user equipment except the second physical channel.

13. The method according to claim 9, wherein performing quantization processing on the first gain factor according to the gain factor of the first physical channel comprises:

if a second ratio is greater than or equal to a smallest value among multiple preset quantitative ratios, performing quantization processing on the first gain factor according to the gain factor of the first physical channel and the multiple preset quantitative ratios, to obtain the second gain factor, so that a first ratio is a greatest preset quantitative ratio that does not exceed the second ratio among the multiple preset quantitative ratios, wherein the first ratio is a ratio between the second gain factor and the gain factor of the first physical channel, and the second ratio is a ratio between the first gain factor and the gain factor of the first physical channel.

14. The method according to claim 13, wherein performing quantization processing on the first gain factor according to the gain factor of the first physical channel and the multiple preset quantitative ratios comprises:

multiplying each of the multiple preset quantitative ratios by the gain factor of the first physical channel, to obtain multiple second numerical values;

selecting, from the multiple second numerical values, second numerical values that are less than or equal to the first gain factor; and determining a greatest value among the selected second numerical values as the second gain factor.

15. The method according to claim 13, wherein performing quantization processing on the first gain factor according to the gain factor of the first physical control channel and the multiple preset quantitative ratios comprises:

selecting, from the multiple preset quantitative ratios, preset quantitative ratios that are less than or equal to the second ratio; and multiplying a greatest value among the selected preset quantitative ratios by the gain factor of the first physical channel, to obtain the second gain factor.

16. The method according to claim 9, wherein performing quantization processing on the first gain factor according to the gain factor of the first physical channel comprises:

setting the second gain factor to 0 if a second ratio is less than the smallest value among the multiple preset quantitative ratios, wherein the second ratio is a ratio between the first gain factor and the gain factor of the first physical channel.

17. The method according to claim 16, wherein setting the second gain factor to 0 is further based on a current timeslot of the user equipment being a timeslot that is used to transmit channel quality indicator (CQI) information of the second physical control channel.

\* \* \* \* \*